United States Patent
Yu

(10) Patent No.: US 11,089,235 B2
(45) Date of Patent: Aug. 10, 2021

(54) SYSTEMS AND METHODS FOR AUTOMATIC DETECTION AND CORRECTION OF LUMINANCE VARIATIONS IN IMAGES

(71) Applicant: SZ DJI TECHNOLOGY CO., LTD, Shenzhen (CN)

(72) Inventor: Lifu Yu, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/742,398

(22) Filed: Jan. 14, 2020

(65) Prior Publication Data

US 2020/0154032 A1 May 14, 2020

Related U.S. Application Data

(63) Continuation of application No. PCT/CN2017/105955, filed on Oct. 12, 2017.

(51) Int. Cl.
*H04N 5/235* (2006.01)
*G03B 7/093* (2021.01)

(52) U.S. Cl.
CPC .......... *H04N 5/2357* (2013.01); *G03B 7/093* (2013.01); *H04N 5/2351* (2013.01); *H04N 5/2353* (2013.01)

(58) Field of Classification Search
CPC .. H04N 5/2357; H04N 5/2351; H04N 5/2353; G03B 7/093
See application file for complete search history.

(56) References Cited

U.S. PATENT DOCUMENTS 5,831,676 A * 11/1998 Takahashi ............ H04N 5/2351
  348/362
8,531,542 B2   9/2013 Cote et al.
(Continued)

FOREIGN PATENT DOCUMENTS

CN      1577040 A    2/2005
CN    101527787 A    9/2009
(Continued)

OTHER PUBLICATIONS

International Search Report from the State Intellectual Property Office of the P.R. China for International Application No. PCT/CN2017/105955, dated Jul. 13, 2018 (4 pages).

*Primary Examiner* — Twyler L Haskins
*Assistant Examiner* — Angel L Garces-Rivera
(74) *Attorney, Agent, or Firm* — Finnegan, Henderson, Farabow, Garrett & Dunner, LLP

(57) ABSTRACT

Systems and methods for reducing a flicker are provided. In some exemplary implementations, the systems and methods may detect a luminance variation indicator in a plurality of images captured by a camera having one or more camera parameters. The luminance variation indicator may include one of a luminance variation frequency or a luminance variation cycle. The exemplary systems and methods may determine a flicker frequency corresponding to the detected luminance variation indicator based at least in part on the camera parameters. The exemplary systems and methods may adjust at least one of the camera parameters to reduce the flicker based on the determined flicker frequency.

18 Claims, 7 Drawing Sheets

(56) References Cited

U.S. PATENT DOCUMENTS

2013/0242143 A1  9/2013  Chen
2014/0078358 A1  3/2014  Takenaka et al.

FOREIGN PATENT DOCUMENTS

| CN | 101582992 | A | 11/2009 | |
|----|-----------|---|---------|---|
| CN | 103516975 | A | 1/2014 | |
| CN | 104104882 | A | 10/2014 | |
| CN | 104219455 | A | 12/2014 | |
| CN | 107209215 | A | 9/2017 | |
| EP | 3099058 | A1 * | 11/2016 | ........... H04N 5/2357 |
| EP | 3099058 | A1 | 11/2016 | |

* cited by examiner

|  |  | Luminance Variation @50 Hz | Luminance Variation @60 Hz |
|---|---|---|---|
| Frame Rate@ 24 | Exposure Time @1/25 | n11 | n21 |
|  | Exposure Time @1/30 | n12 | n22 |
|  | Exposure Time @1/40 | n13 | n23 |
|  | Exposure Time @1/50 | n14 | n24 |
|  | Exposure Time @1/60 | n15 | n25 |
|  | Exposure Time @1/80 | n16 | n26 |
| Frame Rate@ 25 | Exposure Time @1/25 | n17 | n27 |
|  | Exposure Time @1/30 | n18 | n28 |
|  | Exposure Time @1/40 | n19 | n29 |
|  | Exposure Time @1/50 | n110 | n210 |
|  | Exposure Time @1/60 | n111 | n211 |
|  | Exposure Time @1/80 | n112 | n212 |
| Frame Rate@ 30 | Exposure Time @1/30 | n113 | n213 |
|  | Exposure Time @1/40 | n114 | n214 |
|  | Exposure Time @1/50 | n115 | n215 |
|  | Exposure Time @1/60 | n116 | n216 |
|  | Exposure Time @1/80 | n117 | n217 |
|  | Exposure Time @1/100 | n118 | n218 |

*FIG. 6*

SYSTEMS AND METHODS FOR AUTOMATIC DETECTION AND CORRECTION OF LUMINANCE VARIATIONS IN IMAGES

CROSS-REFERENCE TO RELATED PATENT APPLICATIONS

This application is a continuation application of International Application No. PCT/CN2017/105955, filed Oct. 12, 2017, entitled "Systems and Methods for Automatic Detection and Correction of Luminance Variations in Images," which is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to imaging control and, more particularly, to methods and systems for automatic detection and correction of luminance variations in images.

BACKGROUND

Movable objects, such as unmanned aerial vehicles ("UAV") (sometimes referred to as "drones"), include pilotless aircraft of various sizes and configurations that can be remotely operated by a user and/or programmed for automated flight. UAVs can be used for many purposes and are often used in a wide variety of personal, commercial, and tactical applications. In many applications, UAVs can also be equipped with secondary devices to perform various tasks. For instance, UAVs equipped with imaging equipment, such as cameras, video cameras, etc., can capture images or video footage that is difficult, impractical, or simply impossible to capture otherwise. UAVs equipped with imaging devices find particular use in the surveillance, national defense, and professional videography industries, among others, and are also popular with hobbyists and for recreational purposes.

As used herein, an "image" is broadly understood as any image data captured by an imaging device, including pictures and video data. An "exposure time" of the imaging device is the amount of time an image sensor (or portion thereof) in the imaging device is used to capture image data. The exposure time may be controlled by opening and closing a shutter covering an aperture of the imaging device, controlling activation of the image sensor, or using any other technique. A "frame rate" corresponds to a frequency at which different images are captured by the imaging device. When the image sensor captures new image data every frame period, the exposure time must be less than or equal to the period of the frame rate ("frame period"). An image may comprise a plurality of individual pixel values, each representing an intensity corresponding to an accumulated amount of light detected at the image sensor in an area corresponding to the pixel. The "luminance" of an image may correspond to a total (aggregate) of the pixel intensities in one or more regions of the image or the entire image. A "luminance variation" may be determined by comparing the luminance levels in different images, for example, by comparing an amount of luminance for the same region in multiple images. A "luminance variation" may be indicated or represented by a "luminance variation indicator," for example, a luminance variation cycle, a luminance variation frequency, etc. As used herein, an "AC half-period" refers to half of the period of an alternating current (AC) signal. For example, a 60 Hz light-source signal has a period of $\frac{1}{60}$ seconds, so its AC half-period is $\frac{1}{120}$ seconds.

Image quality can be affected by multiple aspects of an UAV's flying environment. For example, when the UAV is flying indoors or outdoors where one or more light sources is present, images captured by a imaging device attached to the UAV may exhibit alternate bright and black stripes from top to bottom of the images if some parameters (e.g., frame rate and exposure time) of the imaging device are not properly selected. In such scenarios, videos produced by the imaging device may present a black stripe that moves continuously and periodically between the top and bottom of the video frames. These types of image defects may be referred to as "flicker" associated with luminance variation (i.e., non-uniform luminance) in the images or videos, and may result from mismatches between frequencies of external light sources and frequencies used in the imaging device, e.g., for frame rates or exposure times.

To address flicker in image data, prior techniques have employed a trial-and-error approach. These known approaches have initially assumed a first AC frequency, for example 50 Hz, is used to drive a light source, then they set a first frame rate and a first exposure time for the imaging device based on the assumed initial light-source frequency. If images captured by the imaging device at the first frame rate and the first exposure time are detected to still have flicker defects, then the initial assumption is determined to be incorrect. In this case, a second AC frequency, for example 60 Hz, may be assumed, and a second frame rate and a second exposure time for the imaging device are set based on the assumed second light-source frequency. This process may be repeated for known light-source frequencies until the flicker defects are sufficiently reduced or eliminated.

Some drawbacks, however, are associated with the conventional approach for removing flicker. For instance, varying the range of exposure times of the imaging device by trial and error may lead to an overexposure or underexposure of the captured images. Further, because of the time and resources required to perform the trial-and-error process, resources in the UAV may be consumed to perform the trial-and-error approach when those resources are instead needed for other flight, control, or processing functions in the UAV. Simultaneous control of the UAV and adjustments to the imaging device also can be challenging during an extensive trial-and-error process, for example, when the captured image data is being used to identify or follow a target object, especially if that target is in motion relative to the UAV.

SUMMARY

The present disclosure relates to systems and methods for reducing a flicker. For example, in some embodiments a method may include detecting a luminance variation indicator in a plurality of images captured by a camera having one or more camera parameters, the luminance variation indicator comprising one of a luminance variation frequency and a luminance variation cycle; determining a flicker frequency corresponding to the detected luminance variation indicator based at least in part on the camera parameters; adjusting at least one of the camera parameters to reduce the flicker based on the determined flicker frequency.

In other disclosed embodiments, a system is provided for reducing a flicker. The system may include a controller having one or more processors. The controller may be configured to detect a luminance variation indicator in a plurality of images captured by a camera having one or more camera parameters, the luminance variation indicator comprising one of a luminance variation frequency and a luminance variation cycle; determine a flickering frequency corresponding to the detected luminance variation indicator based at least in part on the camera parameters; adjust at least one of the camera parameters to reduce the flicker based on the determined flicker frequency.

In another disclosed embodiment, the present disclosure relates to a movable object, such as a UAV, with a camera having one or more camera parameters and a controller in communication with the camera. The controller may be configured to reduce a flicker. To that end, the controller may comprise one or more processors configured to detect a luminance variation indicator in a plurality of images captured by the camera, the luminance variation indicator comprising one of a luminance variation frequency and a luminance variation cycle; determine a flickering frequency corresponding to the detected luminance variation indicator based at least in part on the camera parameters; and adjust at least one of the camera parameters to reduce the flicker based on the determined flicker frequency.

In yet another disclosed embodiment, the present disclosure relates to a non-transitory computer-readable medium storing instructions that, when executed by one or more processors, cause a computer to perform a method of reducing a flicker. The method may include detecting a luminance variation indicator in a plurality of images captured by a camera having one or more camera parameters, the luminance variation indicator comprising one of a luminance variation frequency and a luminance variation cycle; determining a flicker frequency corresponding to the detected luminance variation indicator based at least in part on the camera parameters; adjusting at least one of the camera parameters to reduce the flicker based on the determined flicker frequency.

BRIEF DESCRIPTION OF THE DRAWINGS

FIG. 6 is an exemplary lookup table that may be used to correlate luminance variations, frame rates, exposure times, and light-source frequencies in accordance with the disclosed embodiments.

DETAILED DESCRIPTION

Figure 1:
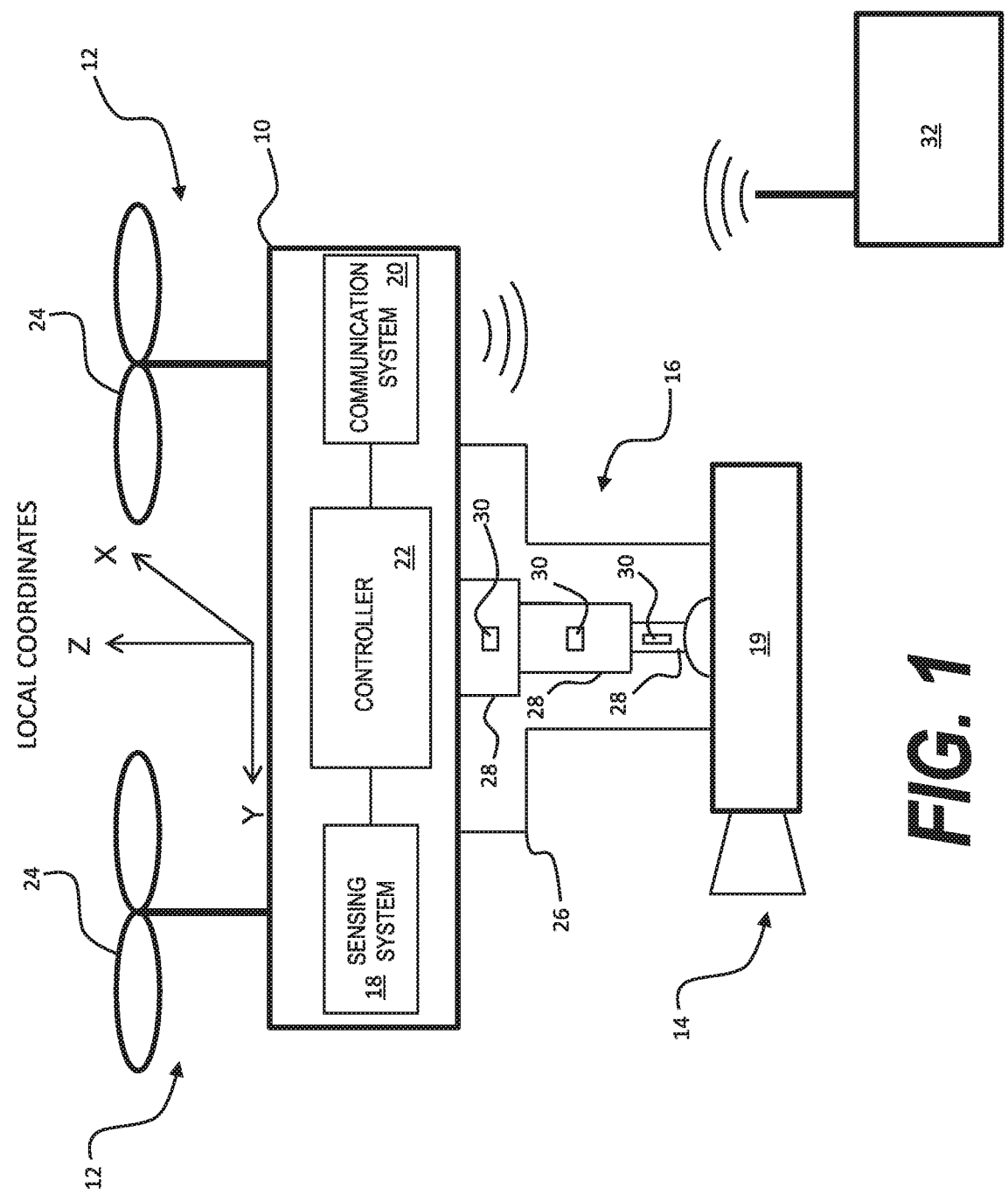
FIG. 1 is a schematic block diagram of an exemplary movable object with a carrier, payload, and control terminal consistent with embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

UAVs are recognized in many industries and in many situations as useful tools for relieving personnel of the responsibility for directly performing certain tasks. For instance, UAVs have been used to deliver cargo, conduct surveillance, and collect various types of imaging and sensory data (e.g., photo, video, ultrasonic, infrared, etc.) in professional and recreational settings, providing great flexibility and enhancement of human capabilities. Although they may be "unmanned," that is, operated without onboard personnel, UAVs are often fully or partially operated by off-board personnel who may be responsible for controlling multiple aspects of flight and/or other associated tasks (e.g., controlling cargo, operating imaging equipment, etc.). In many situations, associated tasks, such as operating imaging equipment mounted to the UAV, must be performed simultaneously with flight control, which can be challenging.

For example, in professional photography, filmography, and videography, UAVs may be used to capture footage from stationary and/or moving perspectives that may be otherwise too challenging, impractical, or impossible for personnel to capture. But the conveniences of UAVs in these situations do not eliminate the need for UAV operators to carefully control the imaging equipment to obtain high image quality results. In addition to being affected by UAV flight parameters (e.g., roll, pitch, yaw, altitude, throttle, relative position or speed with respect to a target, etc.), image quality can also be significantly impacted by a surrounding environment in which the UAV is flying. For example, a UAV may fly at night over an area having artificial light sources (e.g., a football or soccer field), or fly inside a building where light sources are present. These light sources may cause diminished quality of images captured by the UAV due to flickering caused by these light sources.

As is the case for many types of UAVs, multiple flight parameters can be separately controlled by the operator via an input device (e.g., a remote control). During complicated flight maneuvers and/or while collecting imaging data, even highly skilled UAV operators may find difficulty in maintaining a sufficient level of control over each flight parameter while attempting to obtain high quality image results. In these and other situations that demand high quality images, UAV operators may wish for reduced complexity of overall control over imaging equipment. Disclosed herein are exemplary embodiments of methods, systems, and devices for detecting and correcting image defects, such as image flicker (i.e., luminance variation) due to light-source frequencies, that advantageously may allow operators to control movable objects during flight while obtaining high quality images.

FIG. 1 shows an exemplary movable object 10 that may be configured to move or travel within an environment. Movable object 10 may be any suitable object, device, mechanism, system, or machine configured to travel on or within a suitable medium (e.g., a surface, air, water, rails, space, underground, etc.). For example, movable object 10 may be a UAV. Although movable object 10 is shown and described herein as a UAV for exemplary purposes of this description, it is understood that other types of movable objects (e.g., wheeled objects, nautical objects, locomotive objects, other aerial objects, etc.) may also or alternatively be used in embodiments consistent with this disclosure. As used herein, the term UAV may refer to an aerial device configured to be operated and/or controlled automatically (e.g., via an electronic control system) and/or manually by off-board personnel.

Movable object 10 may include one or more propulsion devices 12 and may be configured to carry a payload 14. In some embodiments, as shown in FIG. 1, payload 14 may be connected or attached to movable object 10 by a carrier 16, which may allow for one or more degrees of relative movement between payload 14 and movable object 10. In other embodiments, payload 14 may be mounted directly to movable object 10 without carrier 16. Movable object 10 may also include, among other things, a sensing system 18, a communication system 20, and a controller 22 in communication with the other components.

Movable object 10 may include one or more (e.g., 1, 2, 3, 3, 4, 5, 10, 15, 20, etc.) propulsion devices 12 positioned at various locations (for example, top, sides, front, rear, and/or bottom of movable object 10) for propelling and steering movable object 10. Propulsion devices 12 may be devices or systems operable to generate forces for sustaining controlled flight. Propulsion devices 12 may share or may each separately include or be operatively connected to a power source, such as a motor (e.g., an electric motor, hydraulic motor, pneumatic motor, etc.), an engine (e.g., an internal combustion engine, a turbine engine, etc.), a battery bank, etc., or combinations thereof. Each propulsion device 12 may also include one or more rotary components 24 drivably connected to the power source and configured to participate in the generation of forces for sustaining controlled flight. For instance, rotary components 24 may include rotors, propellers, blades, nozzles, etc., which may be driven on or by a shaft, axle, wheel, hydraulic system, pneumatic system, or other component or system configured to transfer power from the power source. Propulsion devices 12 and/or rotary components 24 may be adjustable (e.g., tiltable) with respect to each other and/or with respect to movable object 10. Alternatively, propulsion devices 12 and rotary components 24 may have a fixed orientation with respect to each other and/or movable object 10. In some embodiments, each propulsion device 12 may be of the same type. In other embodiments, propulsion devices 12 may be of multiple different types. In some embodiments, all propulsion devices 12 may be controlled in concert (e.g., all at the same speed and/or angle). In other embodiments, one or more propulsion devices may be independently controlled with respect to, e.g., speed and/or angle.

Propulsion devices 12 may be configured to propel movable object 10 in one or more vertical and horizontal directions and to allow movable object 10 to rotate about one or more axes. That is, propulsion devices 12 may be configured to provide lift and/or thrust for creating and maintaining translational and rotational movements of movable object 10. For instance, propulsion devices 12 may be configured to enable movable object 10 to achieve and maintain desired altitudes, provide thrust for movement in all directions, and provide for steering of movable object 10. In some embodiments, propulsion devices 12 may enable movable object 10 to perform vertical takeoffs and landings (i.e., takeoff and landing without horizontal thrust). In other embodiments, movable object 10 may require constant minimum horizontal thrust to achieve and sustain flight. Propulsion devices 12 may be configured to enable movement of movable object 10 along and/or about multiple axes.

Payload 14 may include one or more sensory devices 19 Sensory devices 19 may include devices for collecting or generating data or information, such as surveying, tracking, and capturing images or video of targets (e.g., objects, landscapes, subjects of photo or video shoots, etc.). Sensory devices 19 may include imaging devices configured to gathering data that may be used to generate images. For example, imaging devices may include photographic cameras, video cameras, infrared imaging devices, ultraviolet imaging devices, x-ray devices, ultrasonic imaging devices, radar devices, etc. Sensory devices 19 may also or alternatively include devices or capturing audio data, such as microphones or ultrasound detectors. Sensory devices 19 may also or alternatively include other suitable sensors for capturing visual, audio, and/or electromagnetic signals.

Carrier 16 may include one or more devices configured to hold the payload 14 and/or allow the payload 14 to be adjusted (e.g., rotated) with respect to movable object 10. For example, carrier 16 may be a gimbal. Carrier 16 may be configured to allow payload 14 to be rotated about one or more axes, as described below. In some embodiments, carrier 16 may be configured to allow 360° of rotation about each axis to allow for greater control of the perspective of the payload 14. In other embodiments, carrier 16 may limit the range of rotation of payload 14 to less than 360° (e.g., ≤270°, ≤210°, ≤180, ≤120°, ≤90°, ≤45°, ≤30°, ≤15° etc.), about one or more of its axes.

Carrier 16 may include a frame assembly 26, one or more actuator members 28, and one or more carrier sensors 30. Frame assembly 26 may be configured to couple the payload 14 to the movable object 10 and, in some embodiments, allow payload 14 to move with respect to movable object 10. In some embodiments, frame assembly 26 may include one or more sub-frames or components movable with respect to each other. Actuation members 28 may be configured to drive components of frame assembly relative to each other to provide translational and/or rotational motion of payload 14 with respect to movable object 10. In other embodiments, actuator members 28 may be configured to directly act on payload 14 to cause motion of payload 14 with respect to frame assembly 26 and movable object 10. Actuator members 28 may be or include suitable actuators and/or force transmission components. For example, actuator members 28 may include electric motors configured to provide linear or rotation motion to components of frame assembly 26 and/or payload 14 in conjunction with axles, shafts, rails, belts, chains, gears, and/or other components.

Carrier sensors 30 may include devices configured to measure, sense, detect, or determine state information of carrier 16 and/or payload 14. State information may include positional information (e.g., relative location, orientation, attitude, linear displacement, angular displacement, etc.), velocity information (e.g., linear velocity, angular velocity, etc.), acceleration information (e.g., linear acceleration, angular acceleration, etc.), and or other information relating to movement control of carrier 16 or payload 14 with respect to movable object 10. Carrier sensors 30 may include one or more types of suitable sensors, such as potentiometers, optical sensors, visions sensors, magnetic sensors, motion or rotation sensors (e.g., gyroscopes, accelerometers, inertial sensors, etc.). Carrier sensors 30 may be associated with or attached to various components of carrier 16, such as components of frame assembly 26 or actuator members 28, or movable object 10. Carrier sensors 30 may be configured to communicate data and information with controller 22 via a wired or wireless connection (e.g., RFID, Bluetooth, Wi-Fi, radio, cellular, etc.). Data and information generated by carrier sensors 30 and communicated to controller 22 may be used by controller 22 for further processing, such as for determining state information of movable object 10 and/or targets.

Carrier 16 may be coupled to movable object 10 via one or more damping elements configured to reduce or eliminate undesired shock or other force transmissions to payload 14 from movable object 10. Damping elements may be active, passive, or hybrid (i.e., having active and passive characteristics). Damping elements may be formed of any suitable material or combinations of materials, including solids, liquids, and gases. Compressible or deformable materials, such as rubber, springs, gels, foams, and/or other materials may be used as damping elements. The damping elements may function to isolate payload 14 from movable object 10 and/or dissipate force propagations from movable object 10 to payload 14. Damping elements may also include mechanisms or devices configured to provide damping effects, such as pistons, springs, hydraulics, pneumatics, dashpots, shock absorbers, and/or other devices or combinations thereof.

Sensing system 18 may include one or more sensors associated with one or more components or other systems of movable device 10. For instance, sensing system may include sensors for determining positional information, velocity information, and acceleration information relating to movable object 10 and/or targets. In some embodiments, sensing system may also include carrier sensors 30. Components of sensing system 18 may be configured to generate data and information that may be used (e.g., processed by controller 22 or another device) to determine additional information about movable object 10, its components, or its targets. Sensing system 18 may include one or more sensors for sensing one or more aspects of movement of movable object 10. For example, sensing system 18 may include sensory devices associated with payload 14 as discussed above and/or additional sensory devices, such as a positioning sensor for a positioning system (e.g., GPS, GLONASS, Galileo, Beidou, GAGAN, etc.), motion sensors, inertial sensors (e.g., IMU sensors), proximity sensors, image sensors, etc. Sensing system 18 may also include sensors or be configured to provide data or information relating to the surrounding environment, such as weather information (e.g., temperature, pressure, humidity, etc.), lighting conditions (e.g., low light levels), air constituents, or nearby obstacles (e.g., objects, structures, people, other vehicles, etc.).

Communication system 20 may be configured to enable communications of data, information, commands, and/or other types of signals between controller 22 and off-board entities. Communication system 20 may include one or more components configured to send and/or receive signals, such as receivers, transmitter, or transceivers that are configured to carry out one- or two-way communication. Components of communication system 20 may be configured to communicate with off-board entities via one or more communication networks, such as radio, cellular, Bluetooth, Wi-Fi, RFID, and/or other types of communication networks usable to transmit signals indicative of data, information, commands, and/or other signals. For example, communication system 20 may be configured to enable communications between devices for providing input for controlling movable object 10 during flight, such as a control terminal ("terminal") 32.

Terminal 32 may be configured to receive input, such as input from a user (i.e., user input), and communicate signals indicative of the input to controller 22. Terminal 32 may be configured to receive input and generate corresponding signals indicative of one or more types of information, such as control data (e.g., signals) for moving or manipulating movable device 10 (e.g., via propulsion devices 12), payload 14, and/or carrier 16. Terminal 32 may also be configured to receive data and information from movable object 10, such as operational data relating to, for example, positional data, velocity data, acceleration data, sensory data, and other data and information relating to movable object 10, its components, and/or its surrounding environment. Terminal 32 may be a remote control with physical sticks configured to control flight parameters, or a touch screen device, such as a smartphone or a tablet, with virtual controls for the same purposes, or an application on a smartphone or a table, or a combination thereof.

Figure 2B:
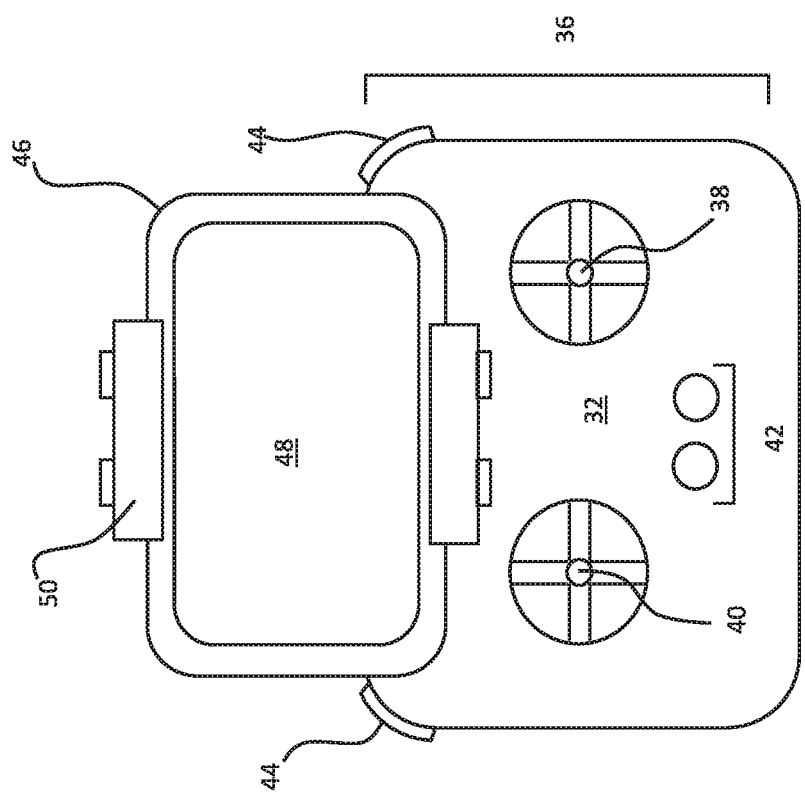
FIGS. 2A and 2B are schematic block diagrams of exemplary control terminals that may be used in accordance with the disclosed embodiments.
Figure 2A:
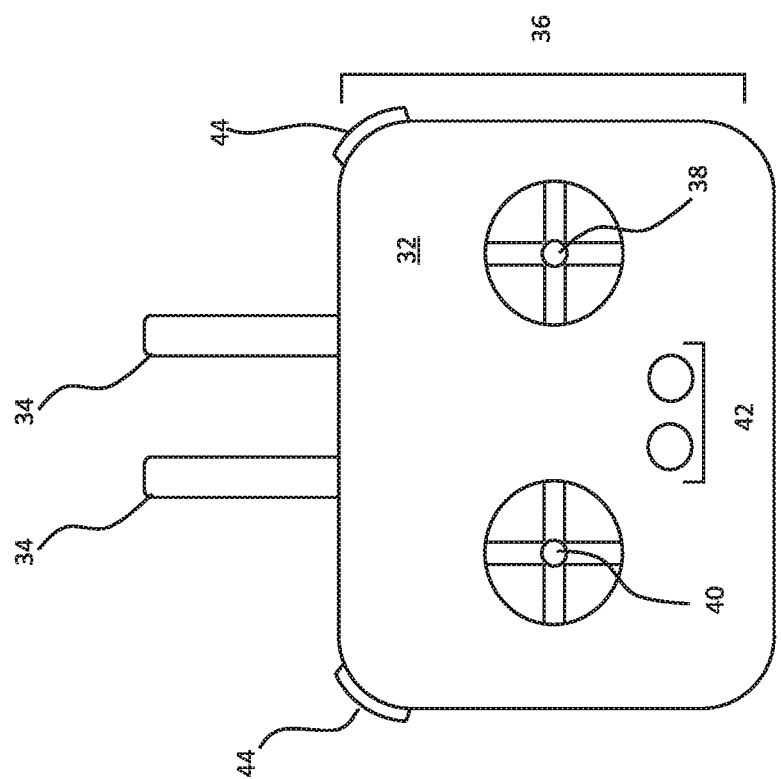

In the example shown in FIGS. 2A and 2B, terminal 32 may include communication devices 34 that facilitate communication of information between terminal 32 and other entities, such as movable object 10. Communication devices 34 may include antennae or other devices configured to send or receive signals. Terminal 32 may also include one or more input devices 36 configured to receive input from a user for communication to movable object 10. FIG. 2A shows one exemplary embodiment of terminal 32 having a plurality of input devices 36 configured to receive user inputs indicative of desired movements of movable object 10 or its components. It is understood, however, that other possible embodiments or layouts of terminal may be possible and are within the scope of this disclosure.

Terminal 32 may include input devices, such as joysticks 38 and 40, buttons 42, triggers 44, and or other types of input device for receiving one or more inputs from the user. Each input device of terminal 32 may be configured to generate an input signal communicable to controller 22 and usable by controller 22 as inputs for processing. In addition to flight control inputs, terminal 32 may be used to receive user inputs of other information, such as manual control settings, automated control settings, control assistance settings etc., which may be received, for example, via buttons 42 and/or triggers 44. It is understood that terminal 32 may include other or additional input devices, such as buttons, switches, dials, levers, triggers, touch pads, touch screens, soft keys, a mouse, a keyboard, and/or other types of input devices.

As shown in FIG. 2B, terminal 32 may also include a display device 46 configured to display and/or receive information to and/or from a user. For example, terminal 32 may be configured to receive signals from movable object 10, which signals may be indicative of information or data relating to movements of movable object 10 and/or data (e.g., imaging data) captured using movable object 10 (e.g., in conjunction with payload 14). In some embodiments, display device 46 may be a multifunctional display device configured to display information on a multifunctional screen 48 as well as receive user input via the multifunctional screen 48. For example, in one embodiment, display device 46 may be configured to receive one or more user inputs via multifunctional screen 48. In another embodiment, multifunctional screen 48 may constitute a sole input device for receiving user input.

In some embodiments, terminal 32 may be or include an interactive graphical interface for receiving one or more user inputs. That is, terminal 32 may be a graphical user interface (GUI) and/or include one or more graphical versions of input devices 36 for receiving user input. Graphical versions of terminal 32 and/or input devices 36 may be displayable on a display device (e.g., display device 46) or a multifunctional screen (e.g., multifunctional screen 48) and include graphical features, such as interactive graphical features (e.g., graphical buttons, text boxes, dropdown menus, interactive images, etc.). For example, in one embodiment, terminal 32 may include graphical representations of input levers 38 and 40, buttons 42, and triggers 44, which may be displayed on and configured to receive user input via multifunctional screen 48. In some embodiments, terminal 32 may be configured to receive all user inputs via graphical input devices, such as graphical versions of input devices 36. Terminal 32 may be configured to generate graphical versions of input devices 36 in conjunction with a computer application (e.g., an "app") to provide an interactive interface on the display device or multifunctional screen of any suitable electronic device (e.g., a cellular phone, a tablet, etc.) for receiving user inputs.

In some embodiments, display device 46 may be an integral component of terminal 32. That is, display device 46 may be attached or fixed to terminal 32. In other embodiments, display device may be connectable to (and disconnectable from) terminal 32. That is terminal 32 may be configured to be electronically connectable to display device 46 (e.g., via a connection port or a wireless communication link) and/or otherwise connectable to terminal 32 via a mounting device 50, such as by a clamping, clipping, clasping, hooking, adhering, or other type of mounting device.

In some embodiments, terminal 32 may be configured to communicate with electronic devices configurable for controlling movement and/or other operational aspects of movable object 10. For example, display device 46 may be a display component of an electronic device, such as a cellular phone, a tablet, a personal digital assistant, a laptop computer, or other device. In this way, users may be able to incorporate the functionality of other electronic devices into aspects of controlling movable object 10, which may allow for more flexible and adaptable control schemes to be used. For example, terminal 32 may be configured to communicate with electronic devices having a memory and at least one processor, which control devices may then be used to provide user input via input devices associated with the electronic device (e.g., a multifunctional display, buttons, stored apps, web-based applications, etc.). Communication between terminal 32 and electronic devices may also be configured to allow for software update packages and/or other information to be received and then communicated to controller 22 (e.g., via communication system 20).

It is noted that other control conventions that relate inputs received via terminal 32 to desired or actual movements of movable device 10 may be used, if desired.

Figure 3:
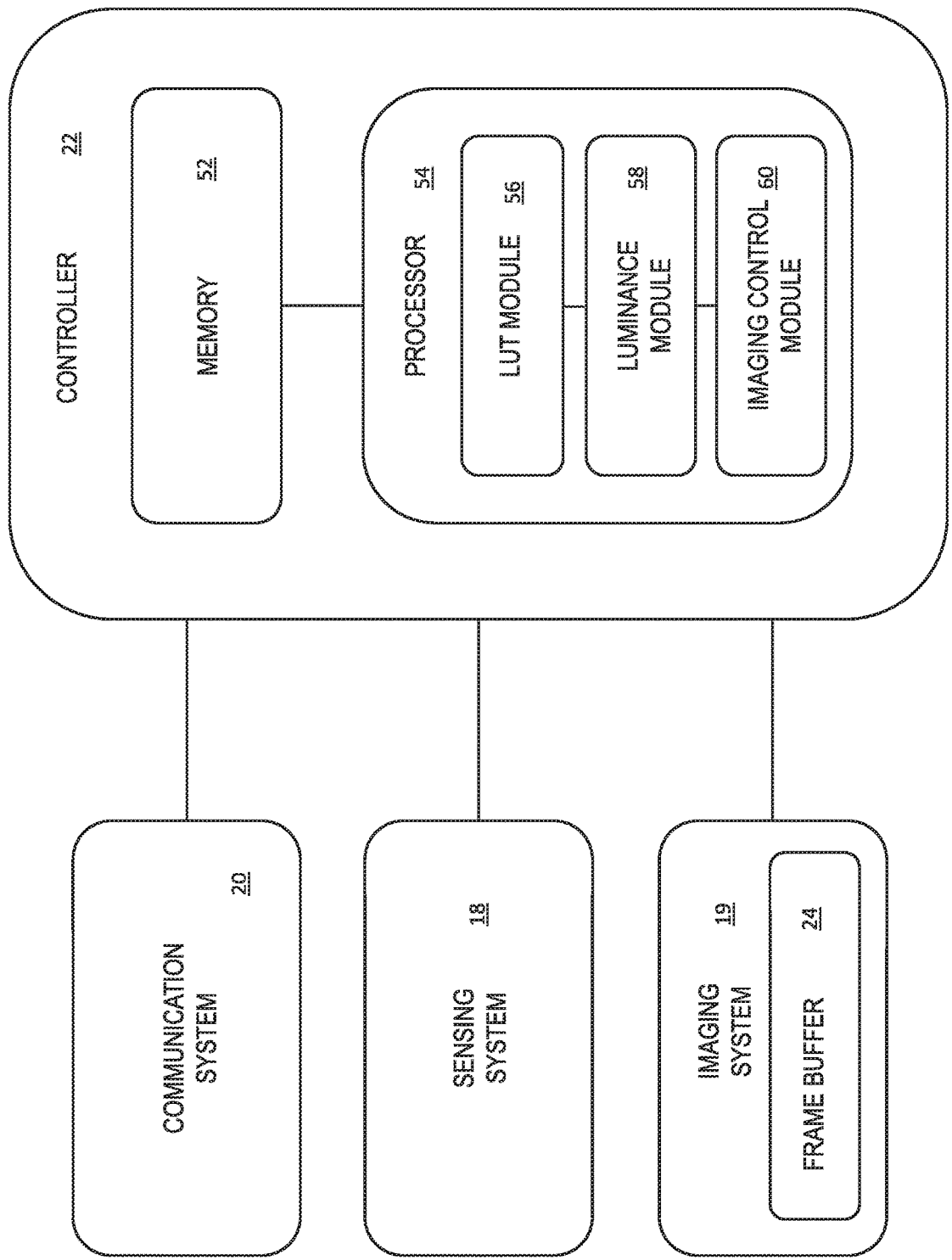
FIG. 3 is a schematic block diagram of an exemplary controller that may be used with the disclosed embodiments.

As shown in FIG. 3, controller 22 may include one or more components, for example, a memory 52 and at least one processor 54. Memory 52 may be or include non-transitory computer readable medium and can include one or more memory units of non-transitory computer-readable medium. Memory 52 may be or include any type of volatile or non-volatile memory including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Memory units may include permanent and/or removable portions of non-transitory computer-readable medium (e.g., removable media or external storage, such as an SD card, RAM, etc.).

Information and data from sensing system 18 may be communicated to and stored in non-transitory computer-readable medium of memory 52. Non-transitory computer-readable medium associated with memory 52 may also be configured to store logic, code and/or program instructions executable by processor 54 to perform any suitable embodiment of the methods described herein. For example, non-transitory computer-readable medium associated with memory 52 may be configured to store computer-readable instructions that, when executed by processor 54, cause the processor to perform a method comprising one or more steps. The method performed by the processor based on the instructions stored in the non-transitory computer readable medium may involve processing inputs, such as inputs of data or information stored in the non-transitory computer-readable medium of memory 52, inputs received from terminal 32, inputs received from sensing system 18 (e.g., received directly from sensing system or retrieved from memory), and/or other inputs received via communication system 20. The non-transitory computer-readable medium may be configured to store sensing data from the sensing module to be processed by the processing unit. In some embodiments, the non-transitory computer-readable medium can be used to store the processing results produced by the processing unit.

In an exemplary embodiment, sensory device 19 may be an imaging system 19 including one or more imaging devices configured to gather data that may be used to generate images for surveying, tracking, and capturing images or video of targets (e.g., objects, landscapes, subjects of photo or video shoots, etc.). For example, imaging devices may include photographic cameras, video cameras, infrared imaging devices, ultraviolet imaging devices, x-ray devices, ultrasonic imaging devices, radar devices, etc. In this exemplary embodiment, the imaging device may be configured to generate optical data of the target for identifying and tracking the target. For example, the imaging device may be an optical device, such as a camera or video camera. The imaging device may be configured to generate imaging data indicative of one or more features of the target. The imaging system 19 may include one or more image frame buffers 24 that are configured to store frames of image data captured by one or more imaging devices, such as a camera or video camera. Imaging system 19 may be further configured to communicate data (e.g., captured image data)

and information with controller 22 via a wired or wireless connection (e.g., RFID, Bluetooth, Wi-Fi, radio, cellular, etc.). Data and information generated by imaging system 19 and communicated to controller 22 may be used by controller 22 for further processing, such as for determining luminance variations Processor 54 may include or more processors and may embody a programmable processor, e.g., a central processing unit (CPU). Processor 54 may be operatively coupled to memory 52 or another memory device configured to store programs or instructions executable by processor 54 for performing one or more method steps. In some embodiments, method steps described herein may be embodied, at least in part, as software code stored in memory 52 and configured to be executed by processor 54.

In some embodiments, processor 54 may be configured to include, be operatively coupled to, or otherwise access one or more control modules, such as a data structure module (e.g., including a lookup table (LUT) module 56), a luminance module 58, and an imaging control module 60, which will be explained in greater detail below. LUT module 56 may be configured to control methods of operating the LUT, such as generating the LUT, modifying the LUT, updating the LUT, searching the LUT, and/or importing the LUT into controller 22 from an external source. Alternatively, the LUT instead may be implemented using a different type of data structure as would be known in the art. Luminance module 58 may be configured to detect image defects such as luminance variations in images captured by imaging system 19 via analyzing the images. Imaging control module 60 may be configured to communicate with imaging system 19 to control imaging devices, such as adjusting a frame rate and/or an exposure time of the imaging devices. LUT module 56, luminance module 58 and imaging control module 60 may be implemented in software for execution on processor 54, or may be implemented in hardware and/or software components separate from processor 54 (not shown in the figure). For example, software for implementing any of the modules 56, 58, and 60 (or portions thereof) may be stored in the memory 52.

Processor 54 can be operatively coupled to the communication system 20 and be configured to transmit and/or receive data from one or more external devices (e.g., terminal 32, display device 46, or other remote controller) using communication system 20. Any suitable means of communication can be used to transfer data and information to or from controller 22, such as wired communication or wireless communication. For example, communication system 20 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, communication system 20 may use line-of-sight communications. The communication system 20 may transmit and/or receive one or more of sensing data from the sensing system 18, processing results produced by the processor 54, control data or user commands from terminal 32 or a remote controller, and the like.

The components of controller 22 can be arranged in any suitable configuration. For example, one or more of the components of the controller 22 can be located on the movable object 10, carrier 16, payload 14, terminal 32, sensing system 18, or an additional external device in communication with one or more of the above. In some embodiments, one or more processors or memory devices can be situated at different locations, such as on the movable object 10, carrier 16, payload 14, terminal 32, sensing system 18, additional external device in communication with one or more of the above, or suitable combinations thereof, such that any suitable aspect of the processing and/or memory functions performed by the system can occur at one or more of the aforementioned locations.

When an UAV travels in an environment where one or more light sources are present, images captured by an imaging device 19 (e.g., a camera) attached to the UAV may exhibit flicker defects due to mismatch between a frequency of an external light source and the frame rate and/or exposure time of the imaging device. Environments with light sources driven by alternating current (AC) power supplies may include, but are not limited to, insides of buildings, insides of rooms, indoor or outdoor field/stadium lighting, street lights, among others. Common light-source frequencies include 50 Hz and 60 Hz, which can cause flicker to manifest as luminance variations in captured images. Of course, other light-source frequencies are possible consistent with the disclosed embodiments. The light-source frequencies may also referred to as flickering frequencies.

In some exemplary embodiments, systems and methods are provided to automatically detect and correct luminance variations in images. Such systems and methods, quickly and accurately identify a light-source frequency of an environment in which an UAV flies, and perform corresponding modules or steps to correct luminance variations based on the identified light-source frequency.

In the disclosed embodiments, LUT module 56 may be configured to provide a LUT. More generally, the LUT may be any data structure containing information correlating luminance variations with frame rates, exposure times, and light-source frequencies. In some embodiments, the data structure may be implemented as an array, a class, an index table, a hash table, a relationship database, etc. The LUT may be generated by controller 22 or may be created anywhere else and loaded onto the movable object 10, for example, in memory 52. For example, the LUT may be generated in an external source, such as a computing device or system that is not a component of or attached to movable object 10, then loaded into controller 22. Further, the LUT may be modified and/or updated, e.g., either by controller 22 or by an external source, to account for different flying environments and/or configurations of the imaging system 19 (e.g., different imaging devices).

Exemplary embodiments that may be used to generate the LUT are described below. The LUT may be created using measurements and/or computational simulations of luminance for different frame rates, exposure times, and light-source frequencies.

For example, an imaging device 19 may capture a plurality of images at a frame rate and an exposure time in an environment where a known AC light source is present. Luminance variations (in a time domain) across the plurality of images can be identified, for example, by measuring luminance of pixels in the same region in each of the captured images. The identified luminance variation may be characterized in terms of a frequency, period, amplitude, and/or any other characteristic of the measured luminance variation. In such embodiments, the measured luminance variation is associated with its corresponding frame rate, exposure time, and light-source frequency, and these values are stored in the LUT. To further build the LUT, this measurement process can be performed for different combinations of frame rate, exposure time, and light-source frequency. In some embodiments, the luminance variations may be measured using one sensor in a sensor array, or may be determined by combining (such as by averaging) measured values across multiple sensors in a sensor array.

Figure 4A:
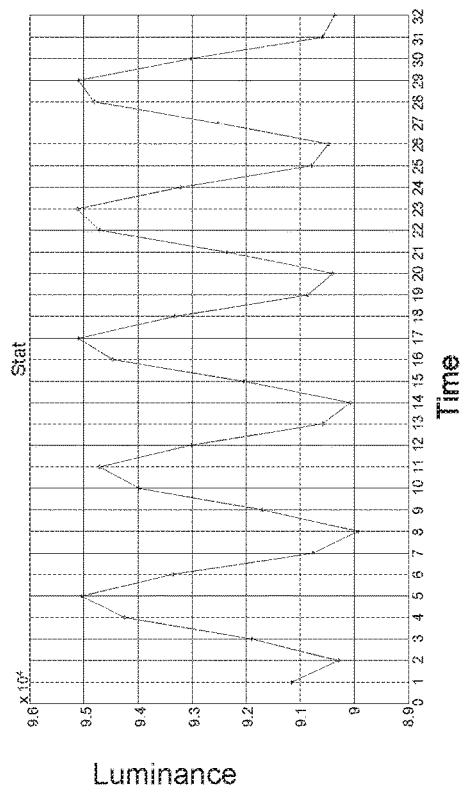
FIG. 4A is a graph showing exemplary measurements of luminance variation in a first sequence of images captured using a first frame rate, a first exposure time, and a first light-source frequency in accordance with the disclosed embodiments.
Figure 5A:
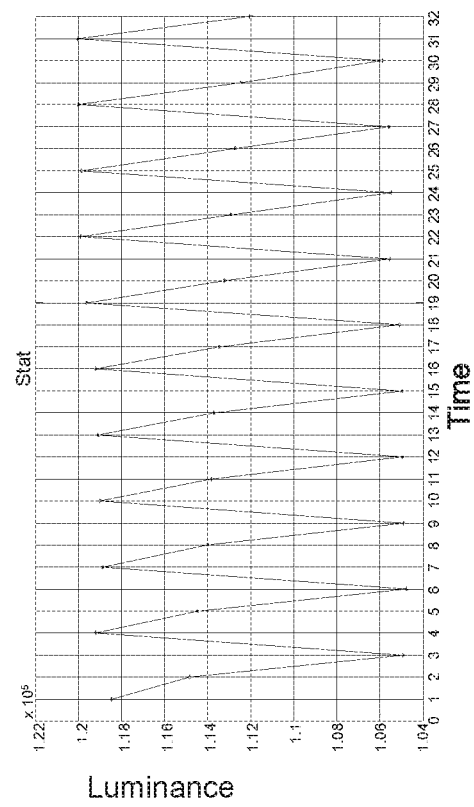
FIG. 5A is a graph showing exemplary measurements of luminance variation in a second sequence of images captured using a second frame rate, a second exposure time, and a second light-source frequency consistent with the disclosed embodiments.

FIGS. 4A and 5A show, respectively, an exemplary first measured luminance variation in images corresponding to a first light-source frequency (50 Hz), a first frame rate (24 frames per second) and a first exposure time (1/80 seconds), and a second measured luminance variation corresponding to a second light-source frequency (50 Hz), a second frame rate (30 frames per second), and a second exposure time (1/160 seconds). The exposure times may correspond to shutter speeds of a global shutter in the imaging device or a predetermined measurement time of a rolling shutter in the imaging device, such that, for example, a shutter speed of a camera may determine a corresponding exposure time. As shown in exemplary FIGS. 4A and 5A, both the first luminance variation and the second luminance variation exhibit a periodic characteristic with a corresponding variation frequency that may be attributable to their corresponding first and second light-source frequencies.

Luminance variations in the LUT also may be determined using simulations based on computational models configured to calculate luminance variations for different sets of frame rates, exposure times, and light-source frequencies. The simulations can be performed using any suitable software and/or hardware, including a commercially available software product (e.g., MatLab) or other software. For example, given a frame rate, an exposure time, and an AC light source with frequency f and amplitude A, a computational model may use equation (1) below to calculate a luminance variation Y as a function of the number of captured images n:

$$Y(n) = \int_{n*\frac{1}{FrameRate}}^{n*\frac{1}{FrameRate}+ExposureTime} |A*\sin(2\pi*f*t)|dt \quad (1)$$

In the disclosed embodiments, equation (1) may be used to simulate luminance variation for images captured by cameras having either a global shutter or rolling shutter.

Figure 4B:
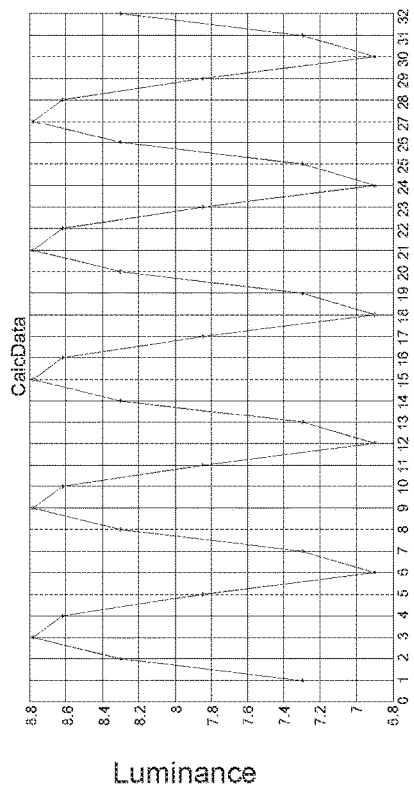
FIG. 4B is a graph showing exemplary simulations of luminance variation in the first sequence of images captured at the first frame rate, the first exposure time, and the first light-source frequency of FIG. 4A, consistent with the disclosed embodiments.
Figure 5B:
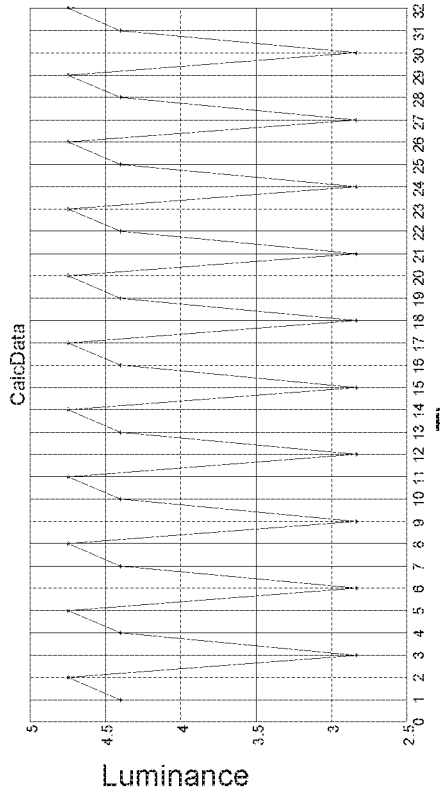
FIG. 5B is a graph showing exemplary simulations of luminance variation in the second sequence of images captured at the second frame rate, the second exposure time, and the second light-source frequency of FIG. 5A, consistent with the disclosed embodiments.

FIG. 4B shows an exemplary first simulation of luminance variation, generated using the MatLab software package by Mathworks, corresponding to the same frame rate, exposure time, and light-source frequency in FIG. 4A (i.e., first light-source frequency 50 Hz, the first frame rate 24 Hz, and first exposure time 1/80 seconds). Similarly, FIG. 5B shows an exemplary second simulation of luminance variation using MatLab, corresponding to the same frame rate, exposure time, and light-source frequency in FIG. 5A (i.e., second light-source frequency 50 Hz, second frame rate 30 Hz, and the second exposure time 1/160 seconds). In this example, the same combinations of frame rate, exposure time, and light-source frequency may be used to determine the same frequencies (or periods) of luminance variations, e.g., demonstrating that luminance variations in the LUT may be determined using measurements and/or simulations.

FIG. 6 shows an exemplary data structure, which may be organized as a LUT in accordance with a disclosed embodiment. The data structure correlates luminance variations with different combinations of frame rates, exposure times, and light-source frequencies. The LUT in FIG. 6 is only illustrative and, in practice, may be any size and may contain additional information. The values n11, n12, n13 . . . represent measured or simulated amounts of luminance variation, such as corresponding to periods or frequencies of luminance variation or other indicative characteristics of luminance variation, such as accumulated amounts of luminance variation, amplitude variance of luminance variation, standard deviations of luminance variation, etc.

According to the disclosed embodiments, the LUT may be used to identify a light-source frequency. For example, when movable object 10 travels in an environment where an AC light source is present, luminance module 58 may be used to automatically analyze captured images and detect luminance variations in the captured images. In an exemplary embodiment, imaging system 19 may communicate with controller 22 to transfer a sequence of captured images from frame buffers 24 to memory 52, and also provide the imaging device parameters, such as frame rate and exposure time, that were used to capture the image data. Luminance module 58 may analyze the image data to measure the luminance variation in the sequence of captured images. Using at least this measured luminance variation, alone or in combination with the frame rate and/or exposure time of the imaging device, the luminance module 58 may use the LUT to identify a matching light-source frequency, for example, where the measured luminance variation is equal to or within a predetermined range (or percentage) of the luminance variation associated with a light-source frequency in the LUT.

To illustrate, consider an example where the luminance module 58 measures a luminance variation of the captured images with a luminance-variation frequency of 10 Hz. Luminance module 58 may search a data structure (e.g., LUT) for the detected luminance variation (e.g., 10 Hz frequency or 1/10 second period) to identify a light-source frequency corresponding to the detected luminance variation. The process of searching the data structure also may be based on the frame rate and the exposure time at which the images were captured. Criteria for matching the detected luminance variation with an amount of luminance variation in the LUT may vary depending on implementation. For example, the detected luminance variation may be required to be exactly the same as a luminance variation stored in the LUT, may be required to be within an acceptable range of a luminance variation stored in the LUT (e.g., within 5%), or may be determined to correspond to a luminance variation in the LUT that is closest to the detected luminance variation. Once a luminance variation in the LUT is found corresponding to the detected luminance variation, frame rate, and exposure time, the light-source frequency in the LUT for that luminance variation is determined to be the frequency of the external light source.

After the frequency of the external light source is identified using the LUT, imaging control module 60 may use this identified light-source frequency to determine a new frame rate and/or exposure time to reduce or eliminate the luminance variation (e.g., flicker) for future images captured by imaging device 19. For example, imaging control module 60 may be configured to transmit a new frame rate and/or exposure time to control system and/or imaging device 19, such that luminance variation may be automatically corrected and/or eliminated in images that will be subsequently captured by the imaging device. For a camera with a rolling shutter, the frame rate may be adjusted to synchronize with the identified light-source frequency. In a camera with a global shutter, the frame rate or exposure time may be adjusted to synchronize with the identified light-source frequency.

In accordance with the disclosed embodiments, imaging control module 60 may control the imaging system 19 to ensure that an accumulated energy detected by an image sensor for each image pixel is the same from image to image, such that luminance variations resulting from a light-source frequency can be corrected or eliminated. One approach may be to ensure that the starting phase of the light source is the same for each pixel when detecting the accumulated energy, which can be implemented by controlling the frame rate or exposure time of the imaging device. In some embodiments, imaging control module 60 may adjust the frame rate so its period is equal to n times the AC half-period of the identified light-source frequency, or adjust the exposure time to be n times the AC half-period of the identified light-source frequency, n being an integer. For example, consider an embodiment where the light-source frequency is determined to be 50 Hz based on a search of the LUT. In this exemplary embodiment, the frame rate may be adjusted so its period is equal to n times the AC half-period (i.e., $\frac{1}{100}$ seconds) of the 50 Hz light-source frequency, e.g., corresponding to 100 frames per second (fps), 50 fps, 33 fps, 25 fps, 20 fps, and so on. Similarly, for a light-source frequency of 60 Hz (i.e., having an AC half-period of $\frac{1}{120}$ seconds), the frame rate may be selected from 120 fps, 60 fps, 40 fps, 30 fps, 24 fps, and so on. This approach may be used for a camera having a global shutter or a rolling shutter.

Another approach for ensuring an accumulated energy detected by an image sensor for each image pixel is the same from image to image may include adjusting an exposure time (or frequency) used to capturing image data at the sensor. For example, for a light-source frequency of 50 Hz, the exposure time may be adjusted to be n times the AC half-period (i.e., $\frac{1}{100}$ seconds) of the identified 50 Hz light-source frequency, e.g., selected from $\frac{1}{100}$ seconds, $\frac{2}{100}$ seconds, $\frac{3}{100}$ seconds, $\frac{4}{100}$ seconds, and so on. For a light-source frequency of 60 Hz having an AC half-period of $\frac{1}{120}$ seconds, the exposure time may be selected from $\frac{1}{120}$ seconds, $\frac{2}{120}$ seconds, $\frac{3}{120}$ seconds, $\frac{4}{120}$ seconds, and so on. In some embodiments, this approach may be preferable for a camera having a global shutter.

Figure 7:
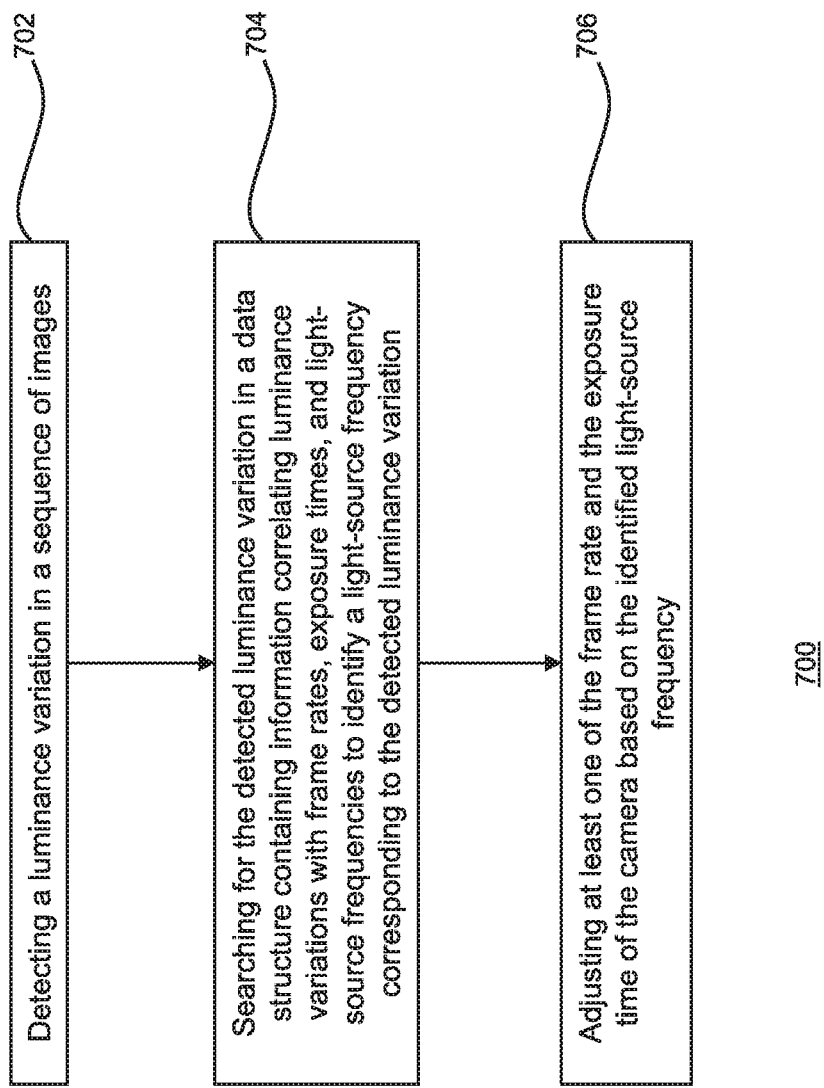
FIG. 7 is a flowchart illustrating an exemplary method for correcting luminance variation in images in accordance with the disclosed embodiments.

FIG. 7 is a flow chart showing an exemplary method 700 for correcting luminance variation in images obtained by an imaging device, such as a camera, having a frame rate and an exposure time, according to a disclosed embodiment. The luminance variation may be caused by flicker, for example, videos produced by the imaging device may present a black stripe that moves continuously and periodically between the top and bottom of the video frames. Thus, the method 700 may also be referred to as a method for reducing flicker. The method 700 may be performed by the above described systems, including UAVs, and may comprise the following steps. At step 702, a luminance variation in a sequence of images is measured. As described above, the sequence of images are captured by one or more image sensors in an imaging device (e.g., a camera) of imaging system 19 and stored in frame buffers 24. In some embodiments, the sequence of images are received by controller 22 and analyzed by luminance module 58 to detect the luminance variation in the sequence of captured images. The luminance variation may be detected by identifying a luminance variation indicator, for example, a frequency or a cycle of the luminance variation (i.e., a luminance variation frequency or a luminance variation cycle, respectively).

At step 704, the detected luminance variation for the captured images is used to search a data structure containing information correlating luminance variations with frame rates, exposure times (or shutter speeds), and light-source frequencies to identify the light-source frequency corresponding to the detected luminance variation. The data structure may be a LUT, and the detected luminance variation is searched to locate a luminance variation in the LUT that matches (e.g., equals, is within a predetermined range or percentage of, or is closest to) the detected luminance variation. A light-source frequency corresponding to the located luminance variation in the LUT may be identified, e.g., which may be 50 Hz or 60 Hz.

In some embodiments, at step 704, a flicker frequency corresponding to the detected luminance variation indicator is determined based at least in part on the camera parameters, for example, a frame rate or a shutter speed. In this embodiment, the "flicker frequency" is a flicker frequency of a sequence of images, such as a video, captured by the imaging device. For example, the flickering frequency may include light-source frequencies. Whether the detected luminance variation indicator is caused by a flicker may be determined by comparing the detected luminance variation indicator with one or more predetermined luminance variation indicators. The one or more predetermined luminance variation indicators may be measured or calculated corresponding to different values of the camera parameters and a plurality of flickering frequencies. The flicker frequency corresponding to the detected luminance variation indicator may be identified from the plurality of frequencies based on the comparison. The comparison between the detected luminance variation indicator and the one or more predetermined luminance variation indicators may be based on various criteria. For example, the detected luminance variation indicator may be considered to match one of the predetermined luminance variation indicators if the difference between the detected luminance variation indicator and the predetermined luminance variation indicator is less than, for example, 5% or 10% or is within any other predetermined range.

In addition to the data structure to be searched, rules and/or formulae may be stored in the controller 22 and applied to obtain the flicker frequency. The flicker frequency may also be calculated on the fly instead of relying on the preexisting data structure.

At step 706, at least one of the frame rate and the exposure time of the camera is adjusted based on the identified light-source frequency. To correct the detected luminance variation in images that will be captured by the camera, the frame rate and/or the exposure time of the camera needs to be adjusted in accordance with the identified light-source frequency. For example, the frame rate may be adjusted such that the period of the frame rate is n times the AC half-period of the identified light-source frequency, n being an integer; alternatively or additionally, the exposure time may be adjusted to be n times the AC half-period of the identified light-source frequency, n being an integer.

In some embodiments, at least one of the camera parameters is adjusted to reduce flicker based on the determined flicker frequency. For example, a frame rate of the camera may be adjusted to be a multiple of the frame rate, or the frame rate may be an integer multiple of the flickering frequency. The shutter speed of the camera may be adjusted such that a period of the flickering frequency is an integer multiple of the shutter speed, or the shutter speed is an integer multiple of the period of the flickering frequency.

In some embodiments, whether to adjust one or more camera parameters is determined based at least in part on the determination of whether the luminance variation indicator is caused by flicker. If so, the one or more camera parameters may be adjusted according to a flickering frequency corresponding to the flicker.

It will be apparent to those skilled in the art that various modifications and variations can be made to the disclosed methods and systems. Other embodiments will be apparent to those skilled in the art from consideration of the specification and practice of the disclosed methods and systems. It is intended that the specification and examples be considered as exemplary only, with a true scope being indicated by the following claims and their equivalents.

What is claimed is:

1. A method for reducing a flicker, the method comprising:
   detecting a luminance variation indicator in a plurality of images captured by a camera, the camera having one or more camera parameters, wherein the luminance variation indicator comprises one of a luminance variation frequency or a luminance variation cycle;
   determining a flicker frequency corresponding to the detected luminance variation indicator based at least in part on the camera parameters, wherein determining the flicker frequency comprises:
      comparing the detected luminance variation indicator with one or more predetermined luminance variation indicators, and
      selecting the flicker frequency from a plurality of predetermined flicker frequencies based on the comparison; and
   adjusting at least one of the camera parameters to reduce the flicker based on the determined flicker frequency.

2. The method of claim 1, further comprising:
   determining whether the detected luminance variation indicator is caused by the flicker by comparing the detected luminance variation indicator with one or more predetermined luminance variation indicators; and
   determining whether to adjust the one or more camera parameters based at least in part on the determination of whether the detected luminance variation indicator is caused by the flicker.

3. The method of claim 1, wherein the determining the flicker frequency comprises:
   searching for the detected luminance variation indicator in a data structure that correlates the one or more camera parameters, predetermined luminance variation indicators, and the plurality of predetermined flicker frequencies,
   wherein the predetermined luminance variation indicators comprise at least one measured or calculated luminance variation indicator.

4. The method of claim 3, wherein the data structure comprises a lookup table.

5. The method of claim 1, wherein the camera parameters include at least one of a frame rate or a shutter speed.

6. The method of claim 5, wherein adjusting the at least one of the camera parameters comprises:
   adjusting the frame rate such that a period of the frame rate is n times an AC half-period of the determined flicker frequency, n being an integer.

7. The method of claim 5, wherein adjusting the at least one of the camera parameters comprises:
   adjusting the shutter speed such that the shutter speed is n times an AC half-period of the determined flicker frequency, n being an integer.

8. The method of claim 1, wherein the flicker frequency is a light-source frequency of 50 Hz or a light-source frequency of 60 Hz.

9. The method of claim 1, wherein the camera has at least one of a global shutter or a rolling shutter.

10. A system for reducing a flicker, the system comprising:
    a controller having one or more processors and being configured to:
       detect a luminance variation indicator in a plurality of images captured by a camera, the camera having one or more camera parameters, wherein the luminance variation indicator comprises one of a luminance variation frequency or a luminance variation cycle;
       determine a flicker frequency corresponding to the detected luminance variation indicator based at least in part on the camera parameters, wherein determining the flicker frequency comprises:
          comparing the detected luminance variation indicator with one or more predetermined luminance variation indicators, and
          selecting the flicker frequency from a plurality of predetermined flicker frequencies based on the comparison; and
       adjust at least one of the camera parameters to reduce the flicker based on the determined flicker frequency.

11. The system of claim 10, wherein the controller is further configured to:
    determine whether the detected luminance variation indicator is caused by the flicker by comparing the detected luminance variation indicator with one or more predetermined luminance variation indicators; and
    determine whether to adjust the one or more camera parameters based at least in part on the determination of whether the detected luminance variation indicator is caused by the flicker.

12. The system of claim 10, wherein the controller is further configured to:
    search for the detected luminance variation indicator in a data structure that correlates the one or more camera parameters, predetermined luminance variation indicators, and the plurality of predetermined flicker frequencies,
    wherein the predetermined luminance variation indicators comprise at least one measured or calculated luminance variation indicator.

13. The system of claim 12, wherein the data structure comprises a lookup table.

14. An unmanned aerial vehicle (UAV) system, comprising:
    a camera having one or more camera parameters; and
    a controller in communication with the camera and configured to reduce a flicker, the controller comprising one or more processors configured to:
       detect a luminance variation indicator in a plurality of images captured by the camera, the luminance variation indicator comprising one of a luminance variation frequency or a luminance variation cycle;
       determine a flicker frequency corresponding to the detected luminance variation indicator based at least in part on the camera parameters, wherein determining the flicker frequency comprises:
          comparing the detected luminance variation indicator with one or more predetermined luminance variation indicators, and
          selecting the flicker frequency from a plurality of predetermined flicker frequencies based on the comparison; and
       adjust at least one of the camera parameters to reduce the flicker based on the determined flicker frequency.

15. The UAV of claim 14, wherein the camera parameters include at least one of a frame rate or a shutter speed.

16. The UAV of claim 15, wherein the controller is further configured to:

adjust the frame rate such that a period of the frame rate is n times an AC half-period of the determined flicker frequency, n being an integer.

17. The UAV of claim 15, wherein the controller is further configured to:
adjust the shutter speed such that the shutter speed is n times an AC half-period of the determined flicker frequency, n being an integer.

18. The UAV of claim 14, wherein the flicker frequency is a light-source frequency of 50 Hz or a light-source frequency of 60 Hz.

* * * * *